(12) United States Patent
Fayssal

(10) Patent No.: US 9,036,471 B2
(45) Date of Patent: May 19, 2015

(54) WIRELESS COMMUNICATION MANAGEMENT SYSTEM AND METHOD

(71) Applicant: GFI Software IP S.àr.l., Luxembourg (LU)

(72) Inventor: Samer Nabih Fayssal, Dunedin, FL (US)

(73) Assignee: LOGICNOW IP LIMITED, St. Helier (JE)

( * ) Notice: Subject to any disclaimer, the term of this patent is extended or adjusted under 35 U.S.C. 154(b) by 227 days.

(21) Appl. No.: 13/863,468

(22) Filed: Apr. 16, 2013

(65) Prior Publication Data
US 2014/0307587 A1   Oct. 16, 2014

(51) Int. Cl.
*G01R 31/08* (2006.01)
*H04L 12/24* (2006.01)
*H04L 12/28* (2006.01)

(52) U.S. Cl.
CPC ................. *H04L 41/0866* (2013.01)

(58) Field of Classification Search
None
See application file for complete search history.

(56) References Cited

U.S. PATENT DOCUMENTS

| | | |
|---|---|---|
| 7,852,819 B2 | 12/2010 | Gil |
| 8,196,199 B2 | 6/2012 | Hrastar |
| 8,213,302 B2 | 7/2012 | Wang |
| 8,339,991 B2 | 12/2012 | Biswas |
| 2013/0016628 A1 | 1/2013 | Bertani |

FOREIGN PATENT DOCUMENTS

WO   2013007344   1/2013

*Primary Examiner* — Eunsook Choi
(74) *Attorney, Agent, or Firm* — Johnston & Martin, PA; James David Johnson

(57) ABSTRACT

A system and method is provided for managing communication of data by a wireless networking device in a zone. The zone may be analyzed to determine compliance with a performance threshold. Conditions such as interference affecting the communication of data may be detected and analyzed to determine a solution. The system may control one or more wireless networking device, which may be heterogeneous, to apply the solution.

20 Claims, 3 Drawing Sheets

WIRELESS COMMUNICATION MANAGEMENT SYSTEM AND METHOD

FIELD OF THE INVENTION

The invention relates to wireless communication. More particularly, the invention relates to management and protection of communications made over a wireless network.

BACKGROUND

Modern computing involves communication among electronic devices. This communication may occur over a network, or a collection of computers and other electronic hardware interconnected by communication channels. Many homes and offices have a number of computers connected via a local area network (LAN). Computers may be networked in the LAN via a wired or wireless network. A wireless local area network (WLAN) is established using a device known as wireless router. The wireless router mostly provides local area network access to wirelessly connected client devices such as notebook/laptop computers, smart phones, tablets, and other portable computer devices.

A wireless router is a hardware device used to provide wireless communication among computerized devices. Wireless routers are manufactured by different vendors and operate using software specifically designed for such specific devices or a narrow range of devices. Most wireless router vendors use different chipsets or electronic hardware, which is operated by different software, or "firmware." Since a plethora of wireless router models are created by numerous different vendors, firmware is typically device-specific.

Through the firmware, a wireless router will use a different set of control commands to remotely manage a WLAN. Different wireless routers, each configurable with different firmware, require inconsistent and often incompatible procedures to access and manipulate the settings of the router. This inconsistency produces a different communication type between a system administrator and a managed wireless router, complicating the management and optimization of a wireless network.

Wireless routers provide wireless communication of electronic devices over a contained geographic area. The bounds of a geographic area depend on the maximum distance that a wireless router signal can propagate on air channels and the ability of mobile clients to respond to the received signal. Many users lack the technical capacity or desire to manipulate the settings of the wireless router to alter the router's settings. However, for most wireless routers in the market, initial or default factory settings do not adapt to the environment where the wireless router is operated. Environmental changes that occur during use in a geographic area typically result in sub-optimal operation. Conditions that may affect performance may include signal reflection, deflection, scattering, and other types of signal degradation. Crowding of wireless networks in a geographic area also causes considerable signal degradation.

In addition, wireless routers are often configured with the same or similar settings during the manufacturing stage. This standardization of default settings may result in a large number of wireless routers fighting over the same channel for multiple wireless networks. Overcrowding on a wireless channel results in a disadvantageous decrease in communication speed and increase in lost connections. In the present state of the art, wireless routers do not communicate among each other to organize or manage the use of the common air channels and are incapable of coordinating a solution to address decreased performance. In modern homes and offices, often many WLANs are established by wireless devices owned by the same individual or business. However, each of those WLANs is managed separately and typically affects other WLANs performance. Highly skilled network administrators require hours to configure and continually reconfigure those networks to function properly and still cannot guarantee results with perpetually optimal performance.

Additionally, improper settings of a wireless router or other wireless networking device can lead to security risks. Members of an improperly managed or incorrectly established wireless network may expose his or her computer to malicious users.

What is needed is a system and method to detect a condition of a wireless network within a zone of wireless networks. What is also needed is a system and method to analyze a condition of a network that is below a performance threshold to determine a solution to affect the degree at which the condition exists. What is needed is a system and method of controlling one or more wireless networking device to apply the solution, wherein the wireless networking devices can be heterogeneous. What is also needed is system to enhance the security of a wireless network.

SUMMARY

According to embodiments of the present invention, a wireless communication management system and method is described to manage and enhance the security of a wireless network. The system and method of the present invention may advantageously detect a condition of a wireless network within a zone of wireless networks. The system and method of the present invention may also analyze a condition of a network that is below a performance threshold to determine a solution capable of affecting the degree at which the condition exists. The system and method of the present invention may control one or more wireless networking device to apply the solution, wherein the wireless networking devices can be heterogeneous.

According to an embodiment of the system and method of the present invention, a system may be provided to manage multiple heterogeneous wireless routers. The system and method may include automatically managing, protecting, and controlling one or more wireless routers equipped with different hardware chipsets and different firmware and/or software. The system and method may monitor wireless channels with respect to managed heterogeneous wireless routers, analyzing conditions such as client-router interactions, wireless signal interference, signal deflection, reflection and/or scattering, and automatically react to wireless network events by calibrating the operations inside every managed wireless router and protected WLAN. The system and method of the present invention may also translate control commands of heterogeneous wireless routers into one set of commands that operable on all supported hardware devices to operate within a performance threshold.

In one aspect, a method is provided for managing communication of data by a wireless networking device, the method being operable on a computerized device with a processor and memory. The method may include a) analyzing a state of the wireless networking device to determine whether the data is communicable over a wireless network in compliance with a performance threshold. The method may also include b) analyzing a zone in which the wireless networking device that is not in compliance with the performance threshold is located to detect a condition that relates to the communication of the data in the zone, wherein the data is communicable by the wireless networking device and a peripheral wireless networking device in the zone. The method may additionally include c) measuring a degree of the condition that affects the communication by the wireless networking device that is not in compliance with the performance threshold from being in compliance with the performance threshold. Also, the method may include d) determining a solution to affect the degree of the condition. Furthermore, the method may include e) controlling the wireless networking device to apply the solution.

In another aspect, for step a), analyzing the state may further include detecting a flag created by the wireless networking device indicative of compliance with the performance threshold.

In another aspect, a plurality of wireless networking devices may be controllable to apply the solution. A first wireless networking device and a second wireless networking device that are heterogeneous are includable in the plurality of wireless networking devices and controllable to apply the solution.

In another aspect, step e) may further include determining the solution to bring the communication of the data in compliance with the performance threshold.

In another aspect, the wireless networking device may communicate at least partially within the zone in which the peripheral wireless networking device communicates.

In another aspect, the condition may include wireless interference. Additionally, the solution may include reducing the wireless interference in the zone.

In another aspect, the solution may include modifying a frequency range of the communication by the wireless networking device in the zone. In another aspect, the solution may include modifying amplitude of the communication by the wireless networking device in the zone.

In one aspect of the present invention, a method may be presented for managing communication of data by a wireless networking device, the method being operable on a computerized device with a processor and memory. The method may include a) analyzing a zone in which the wireless networking device is located and the data is communicable to determine whether the data is communicable over a wireless network in compliance with a performance threshold, wherein the data is communicable by the wireless networking device and a peripheral wireless networking device in the zone. The method may also include b) detecting a condition that relates to the communication of the data that is not in compliance with the performance threshold in the zone. Additionally, the method may include c) measuring a degree of the condition that affects the communication by the wireless networking device that is not in compliance with the performance threshold from being in compliance with the performance threshold, wherein the condition may include wireless interference. Furthermore, the method may include d) determining a solution to affect the degree of the condition. The method may include e) controlling the wireless networking device to apply the solution that at least reduces the wireless interference. The wireless networking device may communicate at least partially within the zone in which the peripheral wireless networking device communicates. Also, a plurality of wireless networking devices may be controllable to apply the solution. Furthermore, a first wireless networking device and a second wireless networking device that are heterogeneous may be included in the plurality of wireless networking devices and controllable to apply the solution.

In another aspect, before step a), the method may include f) analyzing a state of the wireless networking device to determine whether the data is communicable over the wireless network in compliance with the performance threshold.

In another aspect, for step f), analyzing the state further may further include detecting a flag created by the wireless networking device indicative of compliance with the performance threshold.

In another aspect, step d) may further include determining the solution to bring the communication of the data in compliance with the performance threshold.

In another aspect, the solution may include modifying a frequency range of the communication by the wireless networking device in the zone. In another aspect, the solution may include modifying amplitude of the communication by the wireless networking device in the zone.

In one aspect of the present invention, a system is operable on a computerized device with a processor and memory for managing communication of data is presented with an analysis module, a logic module, and a control module. The analysis module may a) analyze a state of the wireless networking device to determine whether the data is communicable over a wireless network in compliance with a performance threshold, and b) analyze a zone in which the wireless networking device that is not in compliance with the performance threshold is located to detect a condition that relates to the communication of the data in the zone, wherein the data is communicable by the wireless networking device and a peripheral wireless networking device in the zone. The logic module may c) measure a degree of the condition that affects the communication by the wireless networking device that is not in compliance with the performance threshold from being in compliance with the performance threshold, wherein the condition includes wireless interference, and d) determine a solution to affect the degree of the condition, wherein the solution at least reduces the wireless interference in the zone. The control module may control one or more wireless networking device to apply the solution.

In another aspect, a plurality of wireless networking devices may be controllable to apply the solution. A first wireless networking device and a second wireless networking device that are heterogeneous are includable in the plurality of wireless networking devices and controllable to apply the solution.

In another aspect, the solution may be determined to bring the communication of the data in compliance with the performance threshold.

In another aspect, the solution may include modifying a frequency range of the communication by the wireless networking device in the zone. In another aspect, the solution may include modifying amplitude of the communication by the wireless networking device in the zone.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
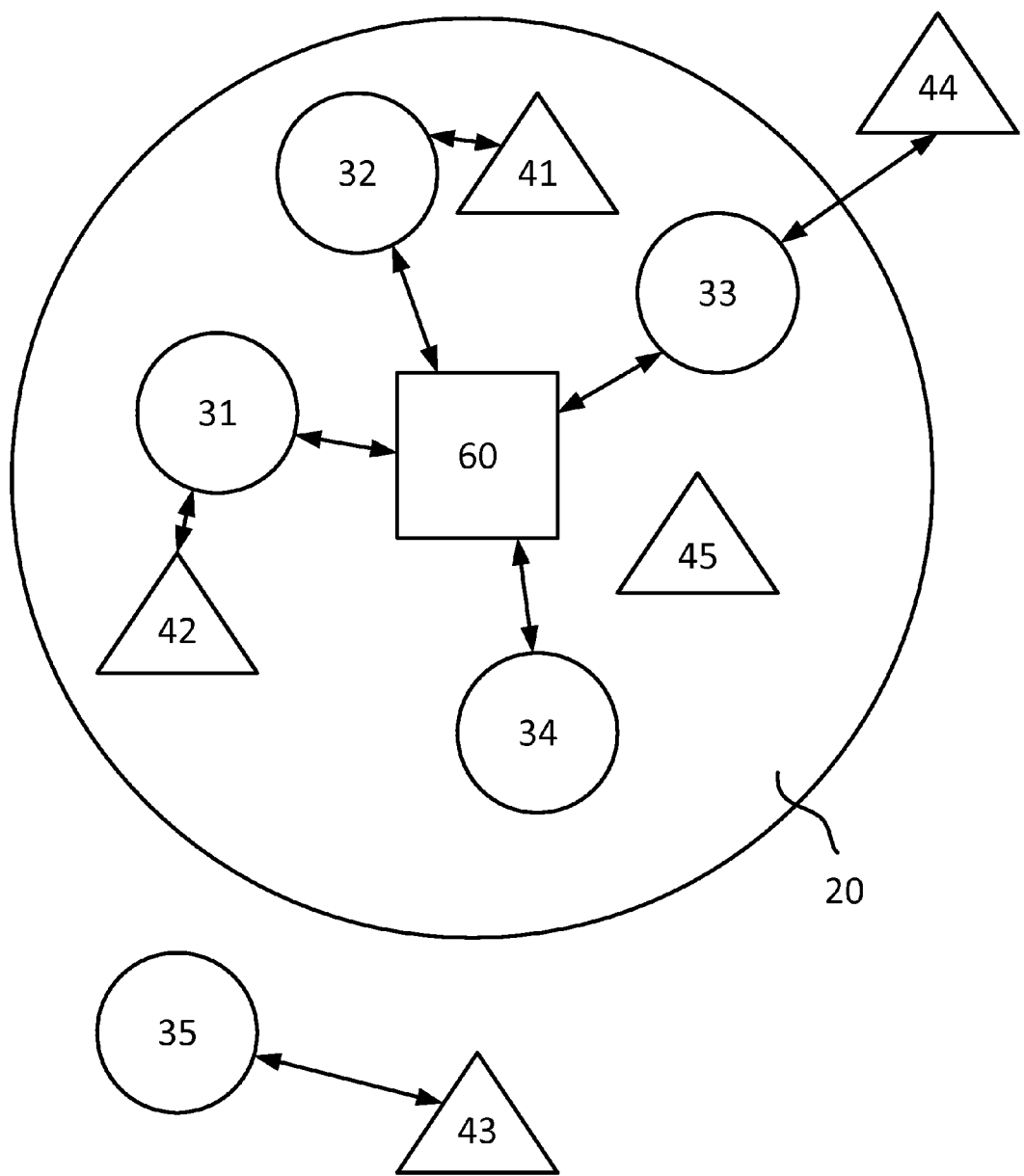
FIG. 1 is a block diagram of an illustrative zone of wireless networks, according to an embodiment of the present invention.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The present invention will now be described in detail with reference to embodiments thereof as illustrated in the accompanying drawings. In the following description, a wireless communication management system and method will be discussed. Those of skill in the art will appreciate alternative labeling of the wireless communication management system and method as a wireless communication management system, control and management system, wireless communication method, system for management and protection for heterogeneous wireless routers (MPH), system, method, the invention, or other similar names. Skilled readers should not view the inclusion of any alternative labels as limiting in any way.

The wireless communication management system will now be discussed. The system may be operated to control one or more wireless networking devices to increase the performance of data communication over a wireless network. Used throughout this disclosure, data communication is defined to include transmission and reception of data, without limitation. A wireless networking device is discussed throughout this disclosure in the context of a wireless router, but may also include any device capable of communicating over a wireless network. Additional wireless networking devices may include client devices, such as desktop computers, notebook/laptop computers, printers, smartphones, network attached storage (NAS) devices, tablets, music players, televisions, audiovisual equipment, other electronic devices, and other devices that would be apparent to a person of skill in the art.

As discussed above, a plurality wireless networking devices may be included in a zone, or a geographic region in which data may be communicated by one or more device. The system may control one or more of the wireless networking devices, which may be located in the zone. Also, one or more wireless networking device may be located in and/or operate at least partially within the same zone, yet not be controllable by the system, which are referred to throughout this disclosure as peripheral wireless networking devices. Although the system may not be able to control data communicated by the peripheral wireless networking devices, the peripheral wireless devices can still create a condition that affects the communication of data within the zone where a controllable wireless networking device is located and/or operated, for example, wireless signal interference. The system may analyze the characteristics of the communications made by the peripheral wireless networking devices to help determine a solution that can be used to control one or more wireless networking device that is controllable to at least partially solve the condition.

Throughout this disclosure, communication of data is discussed as occurring over a wireless network. A wireless network is any type of connection between two or more electronic devices to communicate data or information without being physically attached by wires or cables. For example, a wireless network may be a wireless local area network (WLAN). A WLAN is typically a wireless network established to provide communication between two or more wireless devices within a moderately short distance from a managing device, such as a wireless router. A WLAN may be compliant with a standard, such as IEEE 802.11, communicate using a proprietary standard, and/or use another protocol that would be apparent to a skilled artisan. The WLAN may communicate with one or more wired device through the use of a wireless bridge, as may be proved by a wireless router. In this instance, a wireless device may wirelessly communicate with the wireless router, which may then relay the communication to a wired electronic device via a cable, for example, an Ethernet cable.

The system is operable on a computerized device with a processor and memory. The computerized device may communicate with a wireless networking device, a client device, a network connected device, or another device that would apparent to skilled artisans.

An illustrative computerized device will now be discussed in greater detail. The computerized device may include a processor, memory, network controller, and optionally an input/output (I/O) controller. Skilled artisans will appreciate additional embodiments of a computerized device that may omit one or more of the aforementioned components or include additional components without limitation. The processor may receive and analyze data. The memory may store data, which may be used by the processor to perform the analysis. The memory may also receive data indicative of results from the analysis of data by the processor.

The memory may include volatile memory modules, such as random access memory (RAM), or non-volatile memory modules, such as flash based memory. Skilled artisans will appreciate the memory to additionally include storage devices, such as, for example, mechanical hard drives, solid state data, and removable storage devices.

The computerized device may also include a network controller. The network controller may receive data from other components of the computerized device to be communicated with other computerized devices via a network. The communication of data may be performed wirelessly. More specifically, without limitation, the network controller may communicate and relay information from one or more components of the computerized device, or other devices and/or components connected to the computerized device, to additional connected devices. Connected devices are intended to include data servers, additional computerized device, mobile computing devices, smart phones, tablet computers, and other electronic devices that may communicate digitally with another device. In one example, the computerized device may be used as a server to analyze and communicate data between connected devices.

The computer may also include an I/O interface. The I/O interface may be used to transmit data between the computerized device and extended devices. Examples of extended devices may include, but should not be limited to, a display, external storage device, human interface device, printer, sound controller, or other components that would be apparent to a person of skill in the art. Additionally, one or more of the components of the computerized device may be communicatively connected to the other components via the I/O interface.

The components of the computerized device may interact with one another via a bus. Those of skill in the art will appreciate various forms of a bus that may be used to transmit data between one or more components of an electronic device, which are intended to be included within the scope of this disclosure.

The computerized device may communicate with one or more connected devices via a network. The computerized device may communicate over the network by using its network controller. More specifically, the network controller of the computerized device may communicate with the network controllers of the connected devices. The network may be, for example, the internet. As another example, the network may be a WLAN. However, skilled artisans will appreciate additional networks to be included within the scope of this disclosure, such as intranets, local area networks, wide area networks, peer-to-peer networks, and various other network formats. Additionally, the computerized device and/or connected devices may communicate over the network via a wired, wireless, or other connection, without limitation.

The wireless communication management system may include modules to perform operations useful in managing the wireless communication of data. Skilled artisans will appreciate that a module may include a group of instructions that can be executed via hardware and/or software. In one embodiment, the system may include an analysis module, a logic module, and a control module. The analysis module may allow the system to detect the present condition in a zone. The logic module may allow the system to analyze the conditions detected by the analysis module and determine a solution. The control module may allow the system to control the settings for one or more wireless networking device to apply the solution.

Using the analysis module, the system may analyze a state of a wireless networking device to determine the health of a network. Using the logic module, the system may measure a degree of a condition that affects communication of data over a wireless network and determine a solution to affect the degree of the condition. The system may analyze conditions created by wireless networking device that can be controlled and/or peripheral wireless networking devices, which cannot be controlled. Using the control module, the system may control one or more wireless networking device to affect the degree at which the condition exists. For example, the system may rewrite one or more settings in the firmware of various heterogeneous wireless networking devices to alleviate the degree of which a condition, such as wireless signal interference, affects the communication of data. When controlling the wireless networking device, the system may apply a solution to affect the condition, such as, for example, modifying an amplitude and/or frequency at which data is communicated.

Referring now to FIG. 1, communication of data within a zone and management of the data will now be discussed in greater detail. A zone is defined as a geographic area in which data is communicated. Multiple wireless networking devices may communicate data within a zone, which may include wireless networking devices that are controllable by the system and peripheral wireless networking device, which cannot be controlled by the system. Some wireless networking devices may be located within a zone and communicate at least some data within the zone. Other wireless networking devices may be located outside of the zone, but have a data communication range that at least overlaps or enters the zone. As more wireless networking devices communicate data within the zone, conditions such as signal interference and performance degradation may occur. The conditions may cause dropped connections between wireless devices, slowed data rates, unreliability in data communication, and other undesired conditions that would be apparent to a person of skill in the art.

The system may be included in the zone to manage one or more wireless networking devices. The system may manage the wireless networking devices to communicate data using different transmission and reception parameters than other devices communicating data within the zone. The system may control various wireless networking devices that are manufactured by the same and/or different manufacturers, and which operate on a plethora of firmware variations.

An example of a zone 20 with wireless networking devices is illustrated in FIG. 1. The zone 20 is represented as a geographic region in which one or more wireless networking devices may be located. Wireless networking devices 31, 32, 33, and 34 are located at least partially within the zone 20. Conversely, wireless networking device 35 is located outside of the zone 20, but may still communicate data in a geographic area that is at least partially included by the zone 20. One or more users may connect to each wireless networking device. The user may connect to WLAN created by a wireless networking device, such as a wireless router, using a client device, for example and without limitation, a laptop computer. However, it is possible for no users to be connected to a wireless networking device at a given time, as represented by the wireless networking device 34. In the present example, client device 42 may be connected to the wireless networking device 31, client device 41 may be connected to the wireless networking device 32, and client device 44 may be connected to the wireless networking device 33. An additional client device 45 may be located in the zone 20 and may broadcast and/or receive data wirelessly.

Additionally, a client device 43 may be located outside of the zone 20 and be connected to a wireless networking device 35, which is also outside of the zone 20. Although the client device 43 and wireless networking device 35 are located outside of the zone 20, they may still communicate data using a frequency or other signal transmission protocol that is used by a wireless networking device included in the zone 20. Additionally, peripheral wireless networking devices may be included within and/or outside of the zone 20 and may communicate data wirelessly over channels that could be used by other wireless networking devices.

With the above devices and configurations, in the present example, wireless networking devices 31 and 32 may be different brands of wireless routers, and may be operated by different organizations. Wireless networking devices 31 and 32 may share the same air channels and each may attempt to gain the best bandwidth for its connected users. Lack of communication between the wireless routers 31 and 32 may lead to signal degradation and diminished communication of data.

As additional devices are included in the zone, the degree of a condition that affects communication of data may increases. For example, if wireless networking devices 31 and 32 were both configured with the default settings, which involved communicating data wirelessly using the same frequency ranges, an undesirable condition of wireless interference may develop.

Also, in the present example, a user of the client device 45 may be not connected to any wireless networking device or WLAN and attempt to flood zone 20 with frames on different air channels. For example, the user of the client device 45 may attempt a denial of service (DoS) attack, which may create a condition that affects other wireless networking devices and WLANs in zone 20. If the wireless networking device 34 attempts to resolve the problematic condition separately, without awareness of the other wireless networking devices 31, 32 and 33, it may blindly switch to another air channel that may not solve the problematic condition. Additionally, the condition can worsen because all wireless networking devices in the zone 20 may attempt to switch channels, which would cause a more severe miscommunication among wireless networking devices in zone 20.

The system 60 may be implemented in the zone 20 to control one or more wireless networking devices. The system 60 can communicate with at least one of the wireless networking device, analyze the conditions of the present in the zone, and negotiate a solution to share air channels efficiently. In some embodiments, the solution may include reducing wireless interference within the zone. In the case of a malicious user, such as the user operating the client device 45, the condition created by the malicious user may be detected by the system 60, analyzed according to, for example, the amount of flooding frames and a communication algorithm that is used, and a solution may be determined by the system 60 to resolve the condition and improve data communication. The system 60 may communicate the solution directly to wireless routers 31, 32, 33, and 34 and reorganize their traffic and use to various air channels not subject to the disruptive condition.

Figure 2:
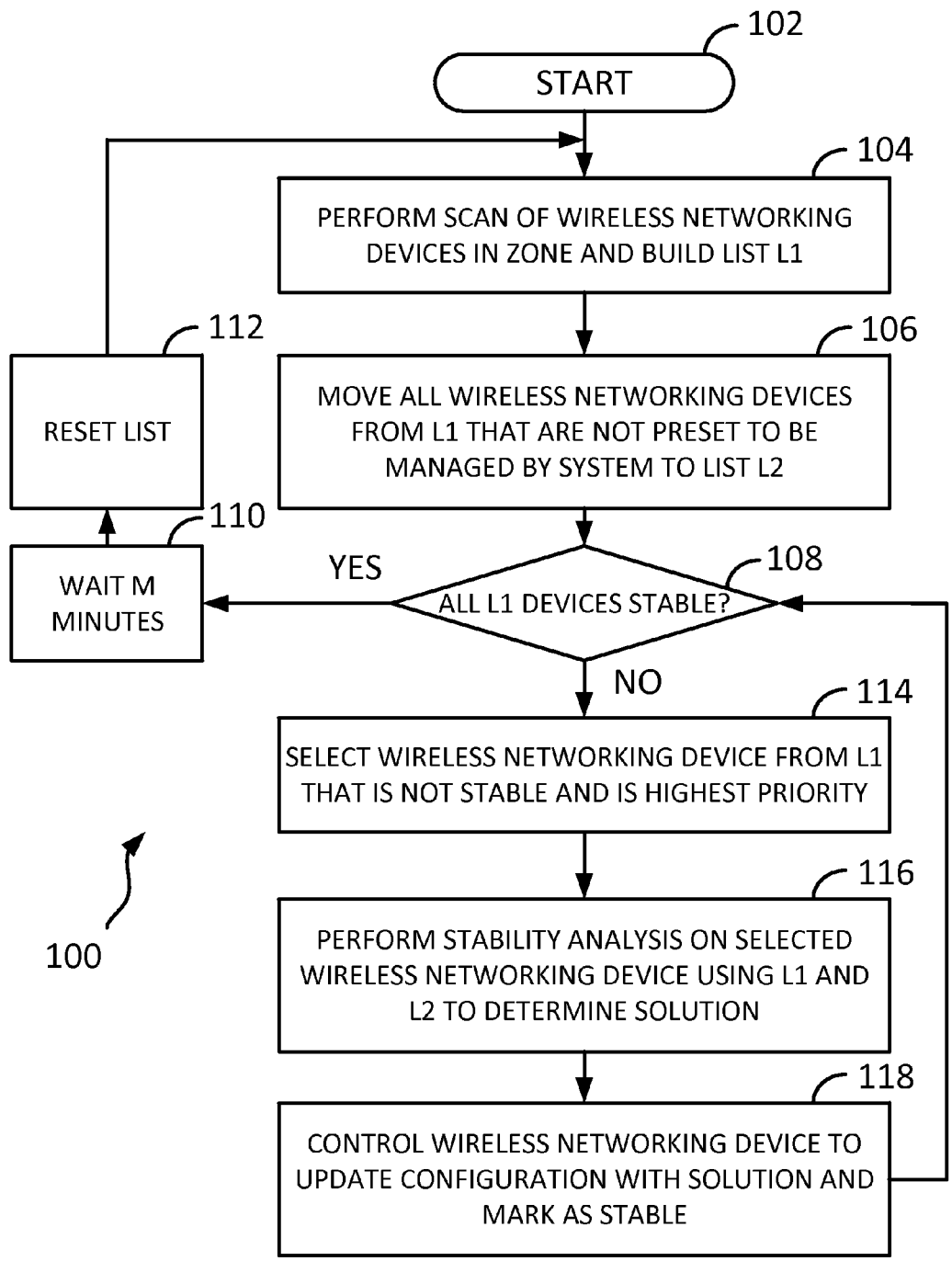
FIG. 2 is a flowchart illustrating an analysis of a state of a wireless networking device, according to an embodiment of the present invention.

Referring now to flowchart 100 of FIG. 2, an illustrative analysis of the state of a wireless networking device will now be discussed. The state of the wireless networking device may be determined, for example, by querying various parameters in the setting of the wireless networking devices to detect a flag, such as one signifying a "Stable" state. Starting at Block 102, the system may perform a scan of all wireless devices within the zone of the system and build a list L1 of wireless networking devices. (Block 104). For example, the system may include all managed wireless networking devices in list L1. The system may then analyze the wireless networking devices in the zone to determine if they are preset to be managed by the system and move the wireless networking devices that are not preset from list L1 to list L2. (Block 106). For example, the system may include all unmanaged wireless networking devices in list L2. The system may then determine if all wireless networking devices in list L1 are stable. (Block 108). For example, the system may check whether the "Stable" flag is set in each wireless networking device included in list L1.

If all wireless networking devices are stable, the system may then wait for a dynamic or predefined period, for example, M minutes. Those of skill in the art will appreciate the wait may be measured in time increments other than minutes, without limitation. (Block 110). After the system has waited for M minutes, it may reset the list. (Block 112). The system may then return to the operation of Block 104, wherein it again scans the zone for wireless networking devices.

If it is determined that not all wireless networking devices are stable at Block 108, the system may pick one wireless networking device from list L1 that is marked as not stable, which may be ranked as the highest priority device. (Block 114). The system may then perform a stability analysis on the selected wireless networking device using lists L1 and L2 to determine a solution to the condition that caused the wireless networking device to be not stable. (Block 116). The analysis may also include determining the state of one or more other wireless device communicating data in the zone. The system may advantageously communicate with a large variety of wireless networking devices, even if they are manufactured by different vendors. After the analysis is complete, the system may update the configuration of the wireless networking device with the solution and mark the device as stable. (Block 118). The system may then return to the operation of Block 108 and again determine if all L1 devices are stable. The system may continue to loop through the operations provided by Blocks 114, 116, and 118 until all L1 devices are determined to be stable, after which the system may proceed to the operation described by Block 110. A person of skill in the art will appreciate that the system may optionally be terminated at virtually any step.

Figure 3:
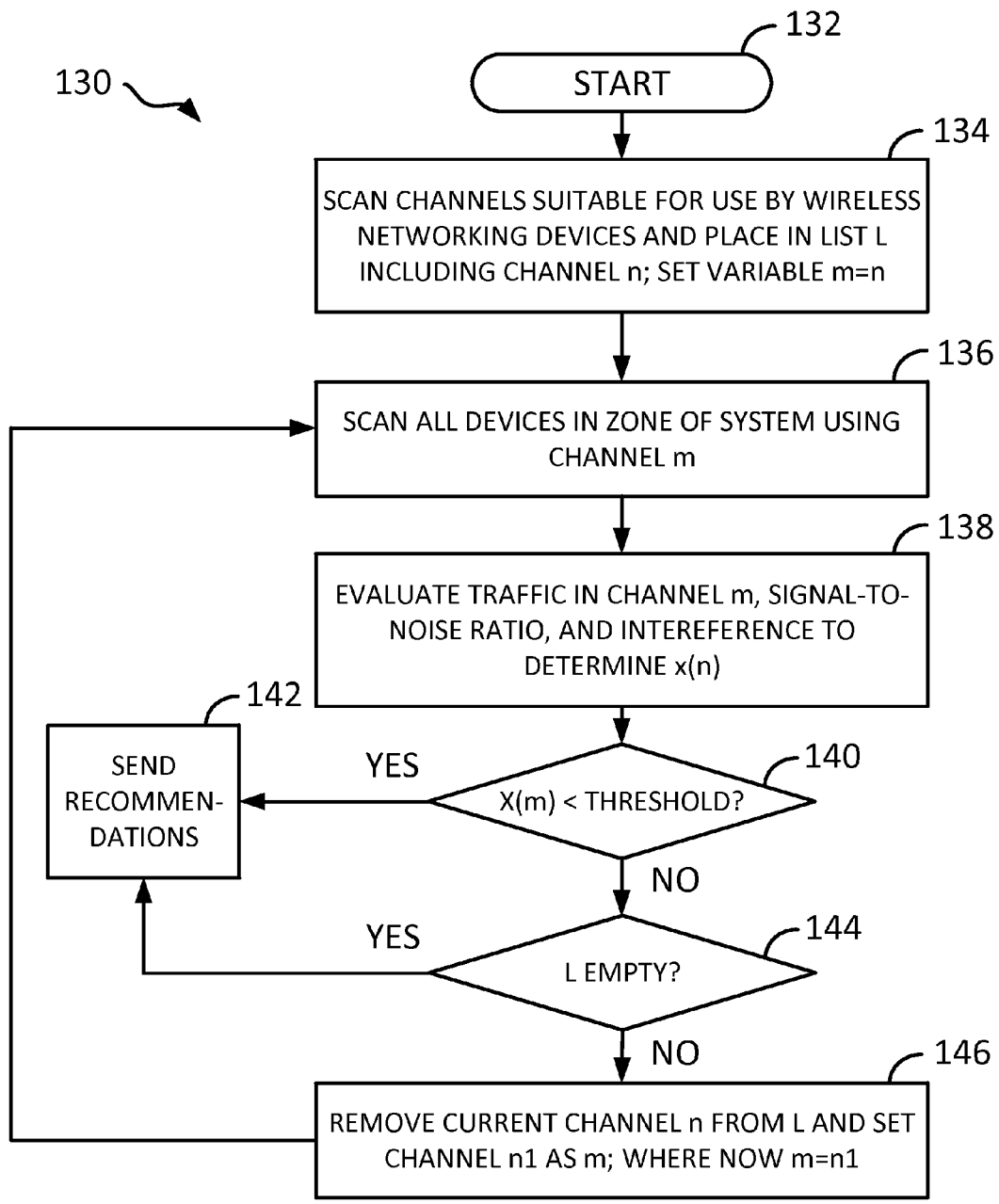
FIG. 3 is a flowchart illustrating a stability analysis of a wireless networking device, according to an embodiment of the present invention.

Referring now to the flowchart 130 of FIG. 3, an illustrative stability analysis will now be discussed. In this example, multiple wireless networking devices may communicate over different channels, where not all devices are using the same data communication channels. Also, the channels used may depend on the communication standards used by the system and connected wireless networking devices. For example, data communicated using the IEEE 802.11 would use a discrete number of channels defined by specific frequency ranges. The system may analyze data communications made by wireless networking devices that are controllable and peripheral wireless networking devices that may be not controllable.

Starting at block 132, the system may scan all channels suitable for a wireless networking device with hardware capabilities to interact with, and/or be controlled by, the system and place them in a list L. (Block 134). The entry for each capable wireless networking device that may be controlled may include a channel "n" that is used by the respective wireless networking device to communicate data. The system may then set a variable "m" to the value of "n." The system may next perform a scan of all wireless networking devices within the zone using the same channel "m." (Block 136). The system may evaluate the amount of data traffic being communicated using channel "m" and related conditions, such as signal-to-noise ratio and wireless signal interference. (Block 138). The degree of the conditions may be combined in an expression "x(n)."

The system may then determine of the degree of the conditions that are not compliant with a performance threshold, which may be represented by the expression X(m) <performance threshold. (Block 140). If the system determines that the conditions are not compliant with the performance threshold, the system may then send a recommendation, which may include a solution to affect the degree of the condition (Block 142). If at Block 140 the system determines that the conditions are compliant with a performance threshold, the system may determine whether list L is empty (Block 144). If it is determined at Block 144 that the list L is empty, the system may send its recommendation, which may, for example, include using the channel for another wireless networking device. (Block 142). If it is determined at Block 144 that list L is not empty, the system may remove the current channel from the list L and select a new channel to analyze, such as "n1." The system may then set "m" to the new value of "n1." (Block 146). The system may next return to the operation of Block 136, wherein all wireless networking devices are scanned using the new value for "m."

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of managing communication of data by a wireless networking device, the method being operable on a computerized device with a processor and memory, the method comprising the steps of:
  (a) analyzing a state of the wireless networking device to determine whether the data is communicable over a wireless network in compliance with a performance threshold;
  (b) analyzing a zone in which the wireless networking device that is not in compliance with the performance threshold is located to detect a condition that relates to the communication of the data in the zone, wherein the data is communicable by the wireless networking device and a peripheral wireless networking device in the zone;
  (c) measuring a degree of the condition that affects the communication by the wireless networking device that is not in compliance with the performance threshold from being in compliance with the performance threshold;
  (d) determining a solution to affect the degree of the condition; and
  (e) controlling the wireless networking device to apply the solution.

2. The method of claim 1, wherein for step (a), analyzing the state further comprises detecting a flag created by the wireless networking device indicative of compliance with the performance threshold.

3. The method of claim 1, wherein a plurality of wireless networking devices are controllable to apply the solution, and wherein a first wireless networking device and a second wireless networking device that are heterogeneous are includable in the plurality of wireless networking devices and controllable to apply the solution.

4. The method of claim 1, wherein step (e) further comprises determining the solution to bring the communication of the data in compliance with the performance threshold.

5. The method of claim 1, wherein the wireless networking device communicates at least partially within the zone in which the peripheral wireless networking device communicates.

6. The method of claim 1, wherein the condition includes wireless interference.

7. The method of claim 6, wherein the solution comprises reducing the wireless interference in the zone.

8. The method of claim 1, wherein the solution comprises modifying a frequency range of the communication by the wireless networking device in the zone.

9. The method of claim 1, wherein the solution comprises modifying an amplitude of the communication by the wireless networking device in the zone.

10. A method of managing communication of data by a wireless networking device, the method being operable on a computerized device with a processor and memory, the method comprising:
   (a) analyzing a zone in which the wireless networking device is located and the data is communicable to determine whether the data is communicable over a wireless network in compliance with a performance threshold, wherein the data is communicable by the wireless networking device and a peripheral wireless networking device in the zone;
   (b) detecting a condition that relates to the communication of the data that is not in compliance with the performance threshold in the zone;
   (c) measuring a degree of the condition that affects the communication by the wireless networking device that is not in compliance with the performance threshold from being in compliance with the performance threshold, wherein the condition comprises wireless interference;
   (d) determining a solution to affect the degree of the condition; and
   (e) controlling the wireless networking device to apply the solution that at least reduces the wireless interference;
   wherein the wireless networking device communicates at least partially within the zone in which the peripheral wireless networking device communicates;
   wherein a plurality of wireless networking devices are controllable to apply the solution;
   wherein a first wireless networking device and a second wireless networking device that are heterogeneous are includable in the plurality of wireless networking devices and controllable to apply the solution.

11. The method of claim 10, further comprising before step (a) the step of:
   (f) analyzing a state of the wireless networking device to determine whether the data is communicable over the wireless network in compliance with the performance threshold.

12. The method of claim 11, wherein for step (f), analyzing the state further comprises detecting a flag created by the wireless networking device indicative of compliance with the performance threshold.

13. The method of claim 10, wherein step (d) further comprises determining the solution to bring the communication of the data in compliance with the performance threshold.

14. The method of claim 10, wherein the solution comprises modifying a frequency range of the communication by the wireless networking device in the zone.

15. The method of claim 10, wherein the solution comprises modifying an amplitude of the communication by the wireless networking device in the zone.

16. A system operable on a computerized device with a processor and memory for managing communication of data comprising:
   an analysis module to:
      (a) analyze a state of the wireless networking device to determine whether the data is communicable over a wireless network in compliance with a performance threshold, and
      (b) analyze a zone in which the wireless networking device that is not in compliance with the performance threshold is located to detect a condition that relates to the communication of the data in the zone, wherein the data is communicable by the wireless networking device and a peripheral wireless networking device in the zone;
   a logic module to:
      (c) measure a degree of the condition that affects the communication by the wireless networking device that is not in compliance with the performance threshold from being in compliance with the performance threshold, wherein the condition includes wireless interference, and
      (d) determine a solution to affect the degree of the condition, wherein the solution at least reduces the wireless interference in the zone; and
   a control module to control the wireless networking device to apply the solution.

17. The system of claim 16, wherein a plurality of wireless networking devices are controllable to apply the solution, and wherein a first wireless networking device and a second wireless networking device that are heterogeneous are includable in the plurality of wireless networking devices and controllable to apply the solution.

18. The system of claim 16, wherein the solution is determined to bring the communication of the data in compliance with the performance threshold.

19. The system of claim 16, wherein the solution comprises modifying a frequency range of the communication by the wireless networking device in the zone.

20. The system of claim 16, wherein the solution comprises modifying an amplitude of the communication by the wireless networking device in the zone.

* * * * *